July 23, 1940.  W. J. VOTH  2,208,691
TAIL GATE HINGE
Filed Sept. 18, 1939    2 Sheets-Sheet 1

Inventor
WILLIAM J. VOTH
by Charles H. Wills Attys

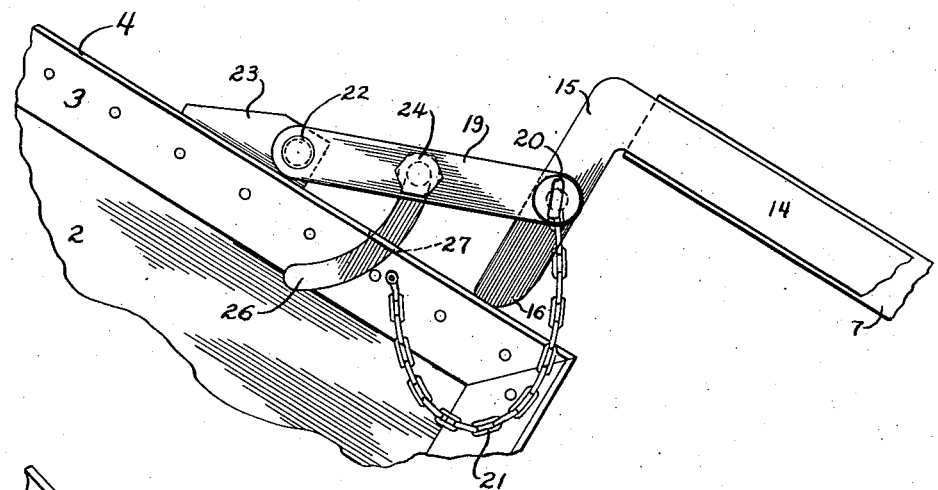
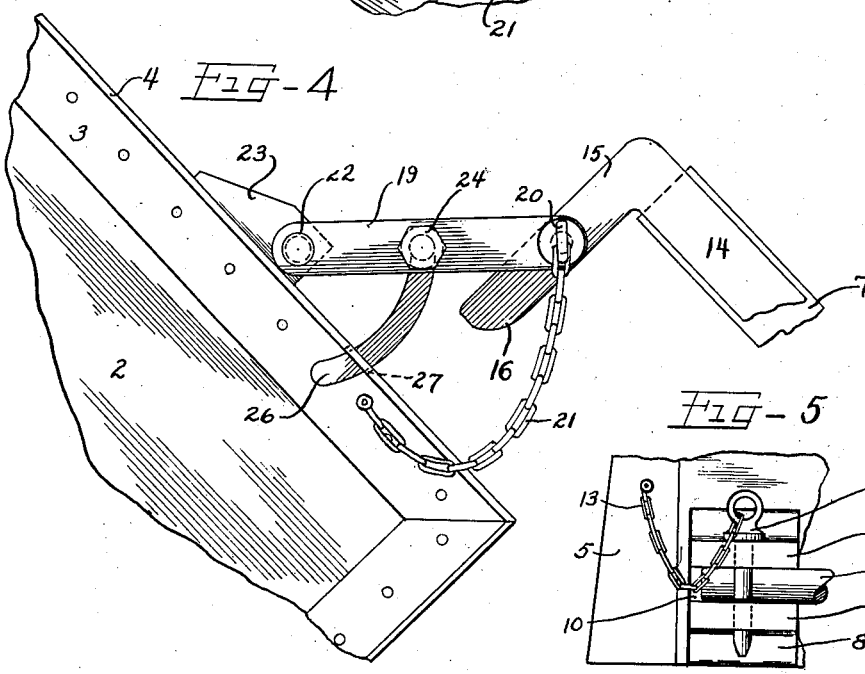
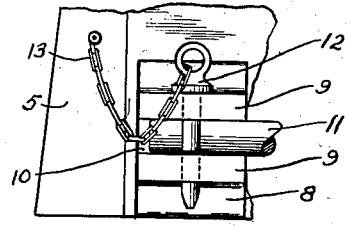

Patented July 23, 1940

2,208,691

UNITED STATES PATENT OFFICE 2,208,691

TAIL GATE HINGE

William J. Voth, Villa Park, Ill.

Application September 18, 1939, Serial No. 295,442

4 Claims. (Cl. 16—135)

The present invention relates to dumping cars or trucks and more particularly to the truck tail gate and the hinge mechanisms connecting the tail gate to the rear portion of a truck body of the tilting or dumping type. The tail gate hinge mechanism is so designed and constructed that material improvements are provided whereby the normal discharge opening of the truck, after a predetermined opening movement of the tail gate, may be increased to facilitate the discharge, of not only light weight dumpage, such as cinders, sand and lumpy coal, but also permitting the discharge of large concrete block, packed masses of clay soil and the like, without applying excessive strains to the hinge mechanisms or damaging of the tail gate. The invention relates more particularly to the improved tail gate hinge mechanisms which are of improved and simplified construction and are of a multiple action type permitting the tail gate to first swing about movable main pivots, and then permit further opening of the tail gate by transferring the major pivotal swing of the tail gate about secondary or auxiliary pivots.

It is an object of this invention to improve the efficiency of truck tail gates by equipping the truck with tail gate hinge mechanisms of a double acting pivot and link hinge construction, of substantially low cost, and affording a variable discharge opening at the rear end of the truck body to accommodate the discharge of not only ordinary materials and refuse but also adapted to conveniently and efficiently permit the discharge of large chunks of materials without endangering the hinge and tail gate construction.

It is also an object of this invention to provide an improved and simplified inexpensive type of dumping truck tail gate hinge mechanism including a toggle or link connection as well as stationary pivots and floating pivots for increasing the discharge opening of the truck.

It is also an object of this invention to provide a dump truck with tail gate hinge mechanisms of a double pivot toggle type whereby the main hinge arms connected to the tail gate are first adapted to rock on the truck body side walls about movable main pivots and about stationary pivots until a predetermined position of the tail gate is reached, after which the rocking action of the tail gate on the truck body is discontinued allowing the discharge opening of the truck to be increased by the further swinging movement of the hinge members about the stationary pivots.

It is a further object of this invention to provide a dump truck with improved tail gate hinge mechanism including main hinge angle arms connected by means of moving pivots to double link or toggle arms provided with guide means coacting with the truck body, said toggle arms connected to the truck body by means of stationary pivots to facilitate increase in the size of the discharge opening from the truck after the maximum normal opening of the tail gate has been reached.

It is an important object of this invention to provide a dump truck or car of the swinging body type, with improved tail gate hinge mechanism of improved simplified and inexpensive construction including stationary and movable pivots connected by properly guided link units connecting hinge angle arms on the tail gate with anchor block units secured to the truck body, to provide a more efficient type of tail gate arrangement whereby the normal maximum opening of the tail gate may be exceeded to increase the discharge opening of the truck to accommodate the discharge of large blocks or chunks of materials which would not slide through the normal maximum discharge opening without the use of the improved double pivot link type of tail gate hinges.

Other and further important objects of this invention will be apparent from the disclosures in the specification and the accompanying drawings.

The invention (in a preferred form) is illustrated in the drawings and hereinafter more fully described.

On the drawings:

Figure 3 is a fragmentary side view of an upper rear corner of the truck body partially tilted and showing the tail gate hinge in a partially open position for the normal maximum opening of the tail gate.

Figure 4 is a similar view showing the hinge mechanism moved into a position beyond the normal opening thereof to increase the opening movement of the tail gate and the discharge opening of the truck.

Figure 5 is a fragmentary elevational view of a lower corner of the rear end of the truck body illustrating a combined hinge and catch device for the tail gate.

As shown in the drawings:

Figure 1:
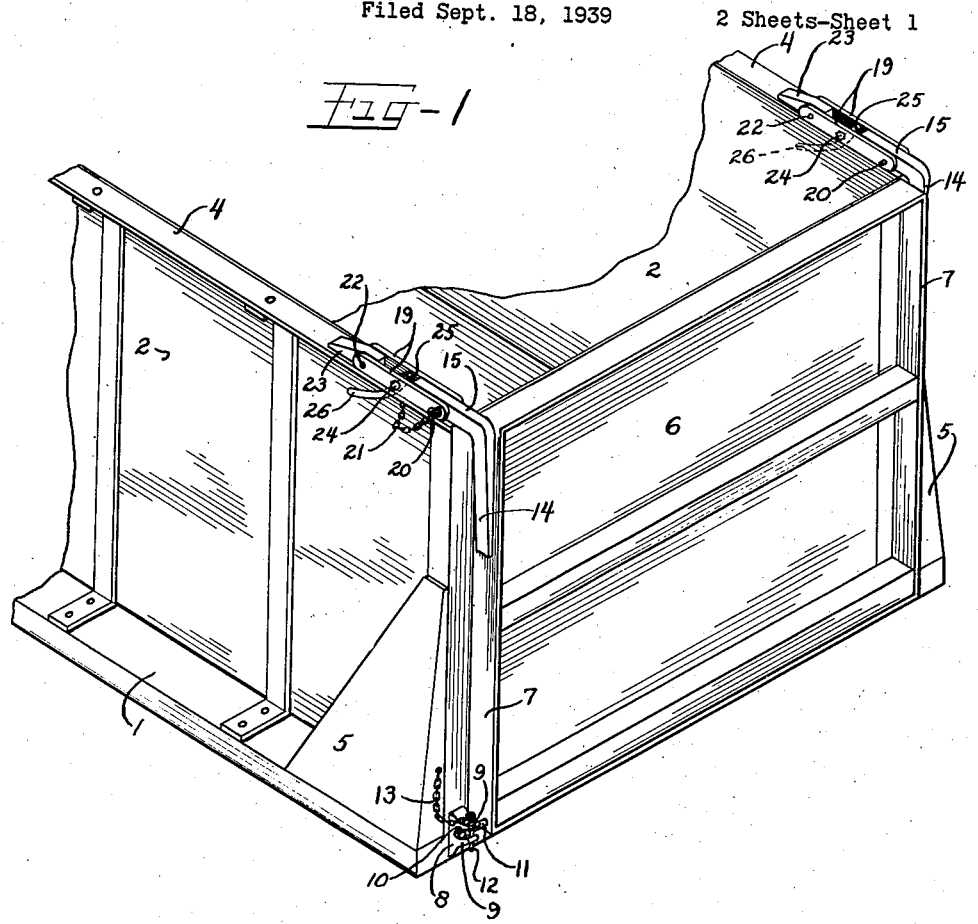
Figure 1 is a fragmentary perspective view of the discharge end of a swing type body of a dump car or truck equipped with improved tail gate hinge mechanisms embodying the principles of this invention.

The reference number 1 represents the bottom of a tiltable or swinging type of dump car or truck body including side walls 2 having rigidly secured to the top longitudinal edges thereof side wall top angle rails each consisting of a mounting flange 3 and a top flange 4. Reinforcing abutments 5 rigidly connect the rear corners of the bottom 1 with the side walls 2. The rear end of the truck body is normally closed by means of a tail gate 6 including the side rails 7. The tail gate 6 is adapted to be swung downwardly by means of combined hinge and catch devices, to serve as a tail board or chute. The combined hinge and catch devices for the lower corners of the tail gate 6, each comprises an anchor block 8 including integral apertured arms 9 forming a pintle receiving recess or notch 10 therebetween for receiving a hinge pintle 11 which projects from the lower end of the side rail 7 of the tail gate 6. To hold the pintle releasably engaged in the recess 10 an eye type of removable locking or latch pin 12 is engaged through the openings in the arms 9 of the hinge block 8. Attached to the eye of the latch pin 12 is one end of a chain 13 the other end of which is attached to a reinforcing abutment 5 of the truck body.

With the locking or latch pin 12 in position as shown in Figure 1 the tail gate 6, when the upper end thereof is released, is adapted to be pivotally swung downwardly to serve as a discharge tail board or chute for the truck body. When it is desired to swing the tail gate 6 upwardly to permit the contents of the body of the truck to be discharged beneath the tail gate, the locking or latch pins 12 are pulled out of the apertured arms 9 of the hinge blocks 8, to release the hinge pintles 11 so that the same may be swung out of the notches 10.

For the purpose of facilitating the upward swinging movement of the tail gate 6 to provide a normally large discharge opening for the truck body or, if desired, an extra large discharge opening to facilitate discharge of large blocks or chunks of material, the upper corners of the tail gate are connected to the upper rear corners of the side walls 2 of the truck body by means of improved, simplified and inexpensive types of strong hinge mechanisms, one of which is located at each side of the rear portion of the truck body as illustrated in Figure 1.

Each of the improved end gate hinge mechanisms comprises a substantially right angled hinge member consisting of a mounting arm 14 which is welded or otherwise rigidly secured to the side rail 7 of the tail gate 6, at the upper end of said side rail to position an integral pivotal or rocker arm 15 to project rearwardly beyond the back of the tail gate 6 to normally rest upon the top surface of the rear end of the top rail flange 4 of the truck body. The arm 15 of the hinge angle member has the lower corner of the end thereof cut away to form a rocker surface 16. For the purpose of connecting the hinge angle member releasably to the remaining portions of the hinge mechanism the hinge arm 15 is provided with an opening or passage 17, intermediate the ends of the hinge arm 15 and said opening is adapted to be positioned to register with openings 18 provided transversely in the ends of a pair of hinge links or toggle bars 19 which are positioned on opposite sides of the hinge arm 15. The angle hinge member is adapted to have the arm 15 thereof releasably connected to the hinge bars or toggle members 19 by means of an eye bolt or eye pin 20 to the eye head of which one end of a chain 21 is connected. The other end of the chain 21 is connected to the mounting flange 3 of the top rail of the truck body side wall 2. The opposite or front ends of the hinge links or toggle bars 19 are provided with transverse openings to engage pivotally on end portions of a stationary or secondary pivot bolt 22 which also engages through a transverse opening provided in a hinge anchor block 23 which is welded or otherwise rigidly secured upon the top surface of the top flange 4 of the side wall top rail of the truck body.

Figure 2:
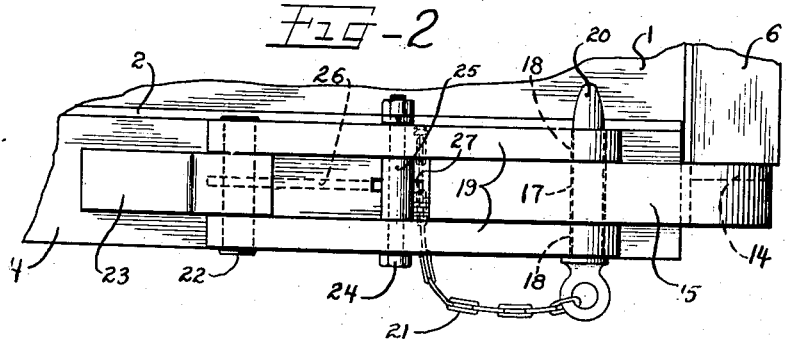
Figure 2 is an enlarged top plan view of the tail gate hinge mechanism showing a fragmentary portion of the truck body and tail gate.

For the purpose of guiding the movement of the hinge members when operated, a bolt 24 projects through suitable openings in the links or toggles 19 at substantially the middle portions thereof to afford a support for a hinge guide mechanism consisting of a sleeve or collar 25 engaged on the shank of the bolt 24 between the hinge links or toggles 19 as clearly illustrated in Figure 2. Rigidly secured to the bottom portion of the spacer sleeve 25 is a curved or arc shaped guide arm 26 which slidably projects through a slot 27 provided in the top flange 4 of the truck side wall top rail.

When it is desired to unload the loaded truck body the lower latch pins 12 are pulled out of the lower hinge block arms 9 to release the hinge pintles 11 thereby unlocking the lower end of the tail gate 6. The loaded truck body may now be tilted or swung into an inclined position by suitable mechanisms forming part of the dumping truck. With the tilting of the truck body the released lower end of the tail gate is permitted to move outwardly due to the action of the material within the truck body. Normally the rocker arms 15 of the hinge angle members rest on the top surfaces of the top rail flanges 4 of the truck body, so that with the beginning of the opening of the tail gate the arms 15 begin to pivot on the main hinge bolts 20 while the rounded ends of the hinge arms 15 start to rock on the top rail flanges 4 towards the position illustrated in Figure 3 thereby raising the main hinge bolts 20 and at the same time causing the hinge link or toggle bars 19 to swing upwardly about the stationary or secondary hinge bolts 22 supported in the anchor blocks 23. The upward movement of the hinge links or toggle bars 19 is guided by means of the guide arms 26 which move through the slots 27 provided in the truck body top rail flanges 4. The pivotal or rocking movement of the tail gate 6 continues to a normal maximum position in which the tail gate 6 is positioned substantially parallel to the top of the truck body and at a spaced distance thereabove depending upon the length of the hinge arms 15. It will thus be noted that the normal discharge opening at the rear end of the truck body is materially greater than the end opening in the truck body thereby providing ample space for the discharge of the contents of the truck body without any danger of injury to the tail gate or the tail gate hinge mechanism.

In case the truck body is loaded with large broken blocks of concrete, large hard chunks of clay or other similar large pieced materials which are too large to pass through the normal maximum discharge opening of the truck body when the gate 6 is in the position illustrated in Figure 3, the tail gate may be opened further by lifting the hinge arms 15 out of contact with the truck body by the continuous upward swing of the hinge links or toggle bars 19 about the stationary or secondary pivots 22 so that the discharge opening of the truck is materially enlarged to permit the discharge of the large blocks of material without excessively straining the hinge parts or injuring the tail gate.

It will thus be noted that the improved tail gate hinge mechanisms are of a floating pivot and rocker arm type including properly guided hinge links or toggles supporting the moving pivots and connected with the stationary pivots mounted on the truck body.

In case it is not desired to provide each hinge mechanism with a separate guide arm 26, the same may be omitted. When this is done the guiding of the links 19 is accomplished by increasing the length of the hinge anchor block 23 to extend to within a short distance of the end of the hinge arm 15, so that the links 19 may be guided by the sides of the anchor block and the sides of the hinge arm 15.

An important feature of the hinge mechanism is the mounting of the angle hinge members 14—15 on the side edges of the tail gate, so that when the bolts 20 are removed and the tail gate is swung downwardly about the combined hinge and catch devices the hinge arms 15 are at the sides of the gate and out of the way, when the tail gate is used as a chute, so that there is less danger of damage being done to said hinge arms. The hinge members 14—15 by being positioned at the sides of the tail gate also act to insure proper registering of the pintles 11 in the recesses 10 of the lower anchor blocks 8, since sagging of the tail gate is obviated.

The improved hinge mechanisms for the dumping truck body are so constructed that with the primary operations of the hinge mechanisms with the outward movement of the tail gate a normally large discharge opening is first provided, which opening may be increased in size to provide a super discharge opening by secondary or continued movements of the hinge parts toward the ultimate limits of movement.

It will of course be understood that various details of construction of the tail gate hinge mechanisms may be varied through a wide range without departing from the principles of this invention and it is, therefore, not the purpose to limit the patent granted hereon otherwise than necessitated by the scope of the appended claims.

I claim as my invention:

1. A gate hinge for use on a dumping truck having an end gate and having a side wall with an upper edge, said hinge comprising a bent lever having one arm to be secured to the end gate and having another arm with a normally free end, means providing a floating fulcrum for said another arm, said means comprising a member to be secured to the edge of the side wall and a rigid link hingedly connected at one end to said member and hingedly connected at the other end to said another arm at a point intermediate the ends of said another arm.

2. A gate hinge for use on a dumping truck having an end gate and having a side wall with an upper edge, said hinge comprising a bent lever having one arm to be secured to the gate and having another arm with a free end arranged for simultaneous sliding along and turning on the upper edge of the side wall as the gate is being elevated, and means providing a floating fulcrum for said another arm, said means comprising a member to be secured to the upper edge of the side wall and a rigid link hingedly connected at one end to said member and hingedly connected at the other end to said another arm at a point intermediate the ends of said another arm.

3. A gate hinge for use on a dumping truck having an end gate and having a side wall with an upper edge, said hinge comprising a bent lever having one arm to be secured to the gate and having another arm with a normally free end for simultaneous sliding along and turning on the upper edge of the side wall as the gate is being elevated, a member to be secured to the side wall at the upper edge thereof, and link means extending between said member and said another arm and pivotally connected at one end to said member and pivotally connected at its other end to said another arm at a point intermediate the ends of said another arm.

4. A gate hinge for use on a dumping truck having an end gate and a side wall with an upper edge, said hinge means comprising an anchor block to be secured to the side wall at the upper edge thereof, a rigid link having one end hingedly connected to said anchor block, and a bent lever having one arm thereof hingedly connected to the other end of said link and at a point intermediate the ends of said one arm, the other arm of said bent lever being adapted to be secured to the gate, said one arm having a normally free end.

WILLIAM J. VOTH.